(12) United States Patent
Hanna et al.

(10) Patent No.: US 6,302,490 B1
(45) Date of Patent: Oct. 16, 2001

(54) SEATBELT CHEST PROTECTOR

(76) Inventors: Patrick Hanna, 520 E. Eagle Lake Dr., Kalamazoo, MI (US) 49009; Robert J. Hanna, 7289 Eagle Ter., Mattawan, MI (US) 49071

(*) Notice: Subject to any disclaimer, the term of this patent is extended or adjusted under 35 U.S.C. 154(b) by 0 days.

(21) Appl. No.: 09/194,234

(22) PCT Filed: May 23, 1997

(86) PCT No.: PCT/US97/09227

§ 371 Date: Jun. 21, 1999

§ 102(e) Date: Jun. 21, 1999

(87) PCT Pub. No.: WO97/44214

PCT Pub. Date: Nov. 27, 1997

Related U.S. Application Data

(60) Provisional application No. 60/018,274, filed on May 24, 1996.

(51) Int. Cl.[7] .................................................. A47C 31/00
(52) U.S. Cl. ............................................................. 297/487
(58) Field of Search .................................. 297/487, 488, 297/464, 465

(56) References Cited

U.S. PATENT DOCUMENTS

| | | |
|---|---|---|
| D. 316,463 | 4/1991 | Gravel . |
| D. 349,589 | 8/1994 | York . |
| 3,232,665 | 2/1966 | Wimmersperg . |
| 3,301,594 | 1/1967 | Pukish, Jr. . |
| 3,386,103 | 6/1968 | Robinson . |
| 3,713,693 | 1/1973 | Cadiou . |
| 3,860,261 | 1/1975 | Takada . |
| 3,936,075 | 2/1976 | Jelliffe . |
| 3,941,404 | 3/1976 | Otaegui-Ugarte . |
| 3,968,994 | 7/1976 | Chika . |
| 4,319,769 | 3/1982 | Compeau et al. . |
| 4,487,201 | 12/1984 | Ciambarella et al. . |
| 4,609,205 | 9/1986 | McKeever . |
| 4,610,463 | 9/1986 | Efrom . |
| 4,786,078 | 11/1988 | Schreier et al. . |
| 4,799,737 | 1/1989 | Greene . |

(List continued on next page.)

FOREIGN PATENT DOCUMENTS

| | | |
|---|---|---|
| 2256650 | 5/1974 | (DE) . |
| 2406513 | 9/1974 | (DE) . |
| 2534547 | 2/1977 | (DE) . |
| 2617506 | 11/1977 | (DE) . |
| 2727443 | 12/1978 | (DE) . |
| 2838821 | 3/1980 | (DE) . |
| 2839141 | 3/1980 | (DE) . |
| 0311923 | 4/1989 | (EP) . |
| 2310902 | 12/1976 | (FR) . |
| 2577492 | 8/1986 | (FR) . |
| 2674803 | 10/1992 | (FR) . |
| 1584148 | 2/1981 | (GB) . |
| 2072488 | 10/1981 | (GB) . |
| 5780935 | 5/1982 | (JP) . |
| 6253268 | 3/1987 | (JP) . |
| 63270262 | 11/1988 | (JP) . |
| 4146852 | 5/1992 | (JP) . |
| 694407 | 10/1979 | (SU) . |
| WO 8804622 | 6/1988 | (WO) . |
| WO 9008676 | 8/1990 | (WO) . |

*Primary Examiner*—Milton Nelson, Jr.
(74) *Attorney, Agent, or Firm*—Carlson, Gaskey & Olds

(57) ABSTRACT

A chest protector (20) for use with a vehicle restraint system having a shoulder strap and a lap belt includes an outer shell (22) having an upper retention bracket (28) opening downwardly for retaining a shoulder strap. At least one locking member (32) is positioned adjacent an opening of said retention bracket. The locking member (32) is selectively movable from a first position substantially closing the opening in the first retention bracket (28) to a second position opening the opening in the first retention bracket.

14 Claims, 4 Drawing Sheets

U.S. PATENT DOCUMENTS

| | | |
|---|---|---|
| 4,832,367 | 5/1989 | Lisenby . |
| 4,848,793 | 7/1989 | Huspen et al. . |
| 4,951,965 | 8/1990 | Brown . |
| 5,016,915 | 5/1991 | Perry . |
| 5,025,534 | 6/1991 | Meijer . |
| 5,042,838 | 8/1991 | Carter . |
| 5,074,588 | 12/1991 | Huspen . |
| 5,080,396 | 1/1992 | Vacanti . |
| 5,080,441 | 1/1992 | Stevenson et al. . |
| 5,154,446 | 10/1992 | Blake . |
| 5,161,258 | 11/1992 | Coltrain . |
| 5,169,174 | 12/1992 | Gray . |
| 5,178,439 | 1/1993 | McCracken . |
| 5,213,366 | 5/1993 | Sweger, Jr. . |
| 5,267,743 | 12/1993 | Smisek . |
| 5,275,468 | 1/1994 | Vacanti . |
| 5,421,614 | 6/1995 | Zheng . |
| 5,468,020 | 11/1995 | Scime . |

SEATBELT CHEST PROTECTOR

This application claims priority to U.S. Provisional Patent Application Ser. No. 60/018,274 filed May 24, 1996.

BACKGROUND OF THE INVENTION

The present invention relates generally to a chest protector for use with a shoulder belt and lap belt in a vehicle.

Current automobiles generally include seat belt systems which include a lap belt and a shoulder strap. The lap belt should be positioned snugly across the hips of the user, and the shoulder strap should extend generally over the shoulder and diagonally across the chest of the passenger. The shoulder strap and lap belt provide increased protection over a system including only a lap belt. Seat belts systems in some automobiles are designed for the body proportions of an adult over 90 lbs. As a result, shorter passengers, such as young children and small adults, are often endangered by the position of the shoulder strap. The shoulder strap of some vehicle safety restraint systems is dangerously positioned across their neck or face. As a result, the seat belt is uncomfortable and they may refuse to wear the seat belt, or may position the shoulder strap behind him or under an arm. More, importantly, in an auto accident, the impact of the shoulder strap on the neck or head can seriously injure the passenger due to the improper positioning of the shoulder strap across the neck or face. If the child has moved the shoulder strap behind him or under his arm, he will defeat the additional safety of a shoulder strap/lap belt combination. This problem has been somewhat alleviated by seat belt systems in many newer vehicles, which provide for the adjustment of the shoulder strap up or down.

One known child chest protector generally comprises a plate placed between the shoulder strap/lap belt combination and the child's chest and abdomen. The plate includes a first plurality of fingers opening downwardly generally along the path of the shoulder strap. A guide extending outwardly from the plate is positioned below the opening of the first plurality of fingers and is spaced away from the first plurality of fingers to facilitate insertion of the seatbelt shoulder strap. The chest protector further includes a second plurality of fingers generally disposed along the path of the lap belt. At least one of the second plurality of fingers are positioned above the lap belt path and open downwardly. At least one of the second plurality of fingers are positioned below the lap belt path and open upwardly.

In operation, the chest protector is worn by the child between the child and the shoulder strap and lap belt. The lap belt is inserted into and retained by the second plurality of opposed fingers. The shoulder strap is inserted into the opening of the first plurality of fingers. Depending upon whether the particular vehicle includes an adjustable shoulder strap, and depending upon the current setting of the adjustable shoulder strap, the first plurality of fingers may deflect the shoulder strap away from the neck and face of the child to the proper safe location across the chest. Further, the plate will increase the surface area of contact between the shoulder strap and lap belt, and the chest and abdomen of the child.

The current design of child chest protectors has several drawbacks. First, the shoulder strap is not securely retained by the first plurality of fingers. Due to the inevitable movement of the child during transportation, the shoulder strap slips out of the first plurality of fingers and may return to the dangerous position across the child's neck or face. Further, the second plurality of opposed fingers improperly positions the lap belt above the hips of the child to a dangerous position. Further, because the plate is flat, the known chest protector is uncomfortable and will tend to concentrate any impact forces in the center of the child's chest and abdomen, rather than distributing the forces more evenly across the entire plate.

In the known chest protector, the plate is manufactured from a relatively hard plastic. Again, this increases the discomfort and does not evenly distribute the force of an impact across the entire area of the plate. Further, the hard plastic does not provide ventilation to the child's body through the plate.

SUMMARY OF THE INVENTION

The present invention provides a chest protector for use with a shoulder belt and lap belt in a vehicle. The chest protector includes an upper retention bracket opening downwardly from an upper end of the chest protector. The chest protector further includes at least one locking tab positioned opposite the upper retention bracket. The upper retention bracket and at least one locking tab define a shoulder belt path.

A center convex portion opens downwardly and forms an upper lap retention portion. A lower lap retention bracket opens upwardly toward the upper lap retention portion to define a lap belt path. The chest protector includes a lower end which extends generally forwardly and which includes the lower lap retention bracket. As a result, the lap belt path is tilted from the vertical position, with the lower lap retention bracket being positioned forwardly of the upper lap retention portion. This properly positions the lap belt on the hips of the wearer.

The outer shell of the chest protector is preferably convex having a rear surface which is concave. The outer shell is preferably hard plastic and includes a foam lining on the rear surface. Ventilation openings in the foam lining generally align with vents in the outer shell.

In operation, the locking tabs are resiliently biased to a position which substantially closes the opening of the upper retention bracket. In order to insert the shoulder strap into the upper retention bracket, the locking tabs must be depressed during insertion. When the shoulder strap is inserted fully into the upper retention bracket, the locking tab is released, returning the locking tab to its original position, substantially closing the opening of the upper retention bracket and retaining the shoulder strap in the upper retention bracket. In order to remove the shoulder strap from the upper retention bracket, the locking tab must be again depressed rearwardly to permit removal of the shoulder strap. As a result, the shoulder strap will be retained in the retention bracket during use.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF THE PREFERRED EMBODIMENT

Figure 1:
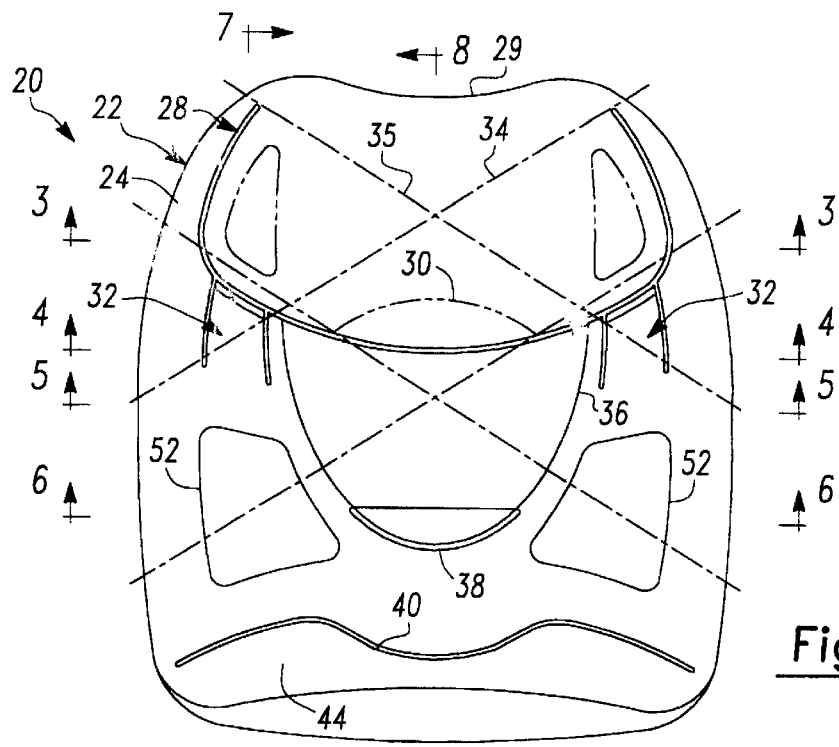
FIG. 1 is a front elevational view of the chest protector of the present invention.

An improved chest protector 20 according to the present invention is shown in FIG. 1. The chest protector 20 generally comprises an outer shell 22 having a front surface 24. An upper retention bracket 28 opens downwardly from the upper end 29 of the chest protector 20 and is positioned outwardly from the front surface 24 of the outer shell 22. The upper retention bracket 28 includes an outwardly turned portion 30 to facilitate the insertion of a shoulder strap. As can be seen in FIG. 1, the upper retention bracket 28 can be used to retain either the left or right shoulder strap. The chest protector 20 further includes a pair of locking tabs 32 positioned opposite the upper retention bracket 28. The locking tabs 32 are disposed on either side of an axial centerline. The upper retention bracket 28 and locking tabs 32 define a left shoulder belt path 34 and a right shoulder belt path 35.

The outer shell 22 further includes a center convex portion 36 which forms an upper lap retention portion 38 which extends slightly from the front surface 24 of the outer shell 22. The upper lap retention portion 38 opens downwardly toward a lower lap retention bracket 40 which extends slightly from the front surface 24 of the outer shell 22 and opens upwardly toward the upper lap retention portion 38. The upper lap retention portion 38 and lower lap retention bracket 40 define a lap belt path 44. The outer shell 22 preferably further includes a pair of vents 52 on either side of the center convex portion 36 and slightly overlapped by the lap belt path 44.

Figure 2:
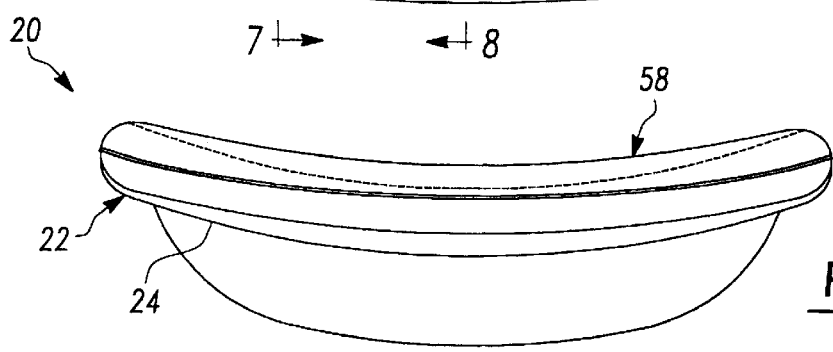
FIG. 2 is a top view of the chest protector of FIG. 1.

As can be seen in FIG. 2, the front surface 24 of the outer shell 22 is preferably convex. The rear surface 56 of the outer shell 22 is preferably concave. The outer shell 22 is preferably a hard plastic, such as santoprene, a foam lining 58 is generally disposed on the rear surface 56 of the outer shell 22. The outer shell 22 is preferably the same color as the vehicle interior, or a coordinated color. The contours of the outer shell 22 also preferably match or complement the contours of the vehicle interior.

Figure 3:
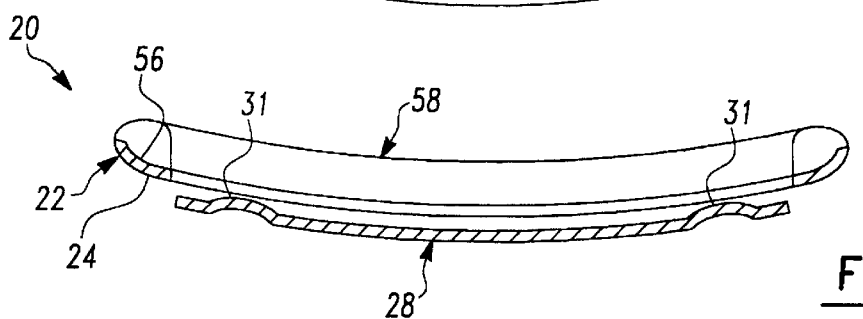
FIG. 3 is a sectional view along line 3—3 of FIG. 1.

As can be seen in FIG. 3, the upper retention bracket 28 is spaced slightly away from the front surface 24 of the outer shell 22. The retention dimples 31 extend rearwardly from the upper retention bracket 28 in order to assist in retaining the shoulder strap under the upper retention bracket 28.

Figure 4:
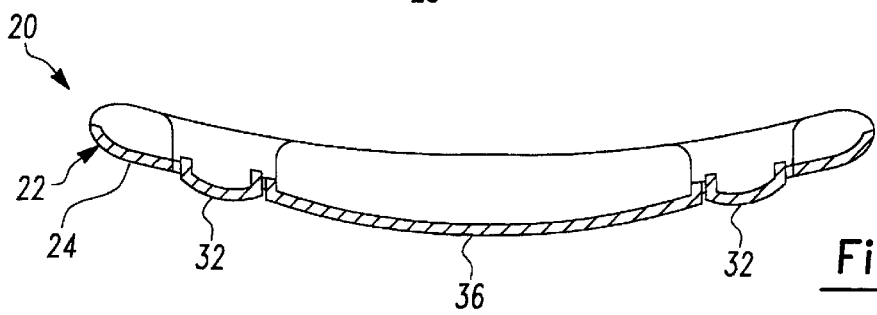
FIG. 4 is a sectional view along line 4—4 of FIG. 1.

As can be seen in FIG. 4, the locking tabs 32 disposed adjacent the upper retention bracket 28 extend outwardly from the front surface 24 of the outer shell 22. However, during insertion and removal of the shoulder strap from the upper retention bracket 28, the locking tabs 32 are depressed to allow insertion or removal of the shoulder strap. During operation, the locking tabs 32 prohibit the inadvertent removal of the shoulder strap from the upper retention bracket 28. Further, the chest protector 20 is more suitable for use by the driver of the vehicle because the shoulder strap will not slide out of the upper retention bracket 28 due to the movement of the driver's arms while driving.

Figure 5:
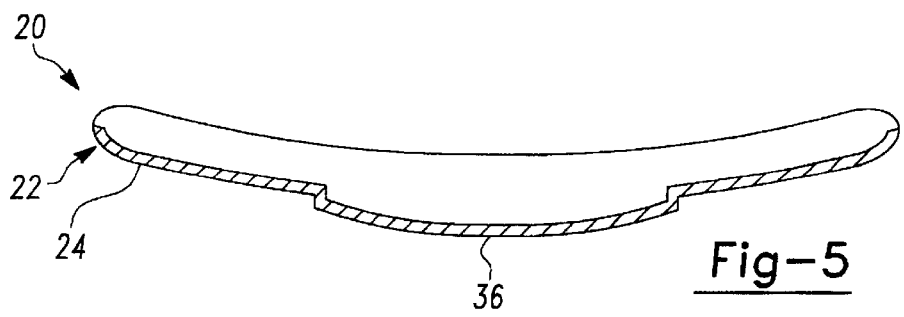
FIG. 5 is a sectional view along line 5—5 of FIG. 1.
Figure 6:
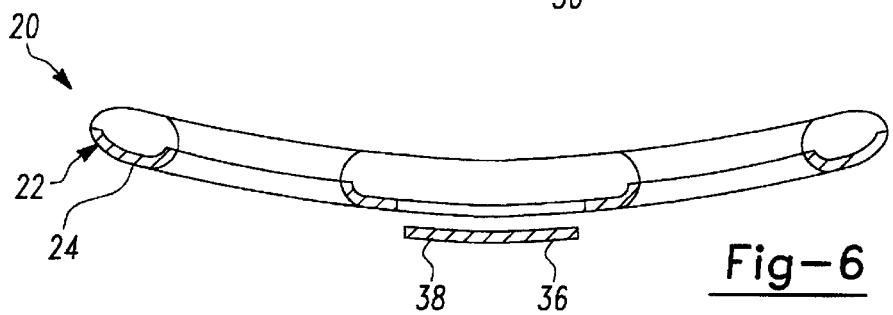
FIG. 6 is a sectional view along line 6—6 of FIG. 1.

As can be seen in FIG. 5, the center convex portion 36 extends downwardly and outwardly from the front surface 24 of the outer shell 22 in order to form the upper lap retention portion 38, as shown in FIG. 6.

Figure 7:
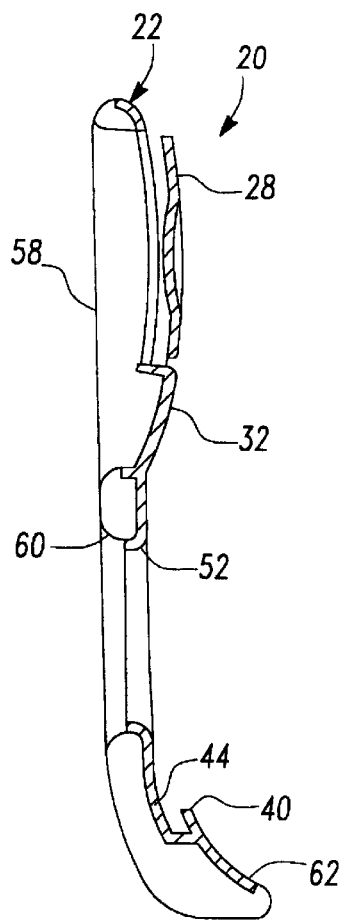
FIG. 7 is a sectional view along line 7—7 of FIG. 1.
Figure 8:
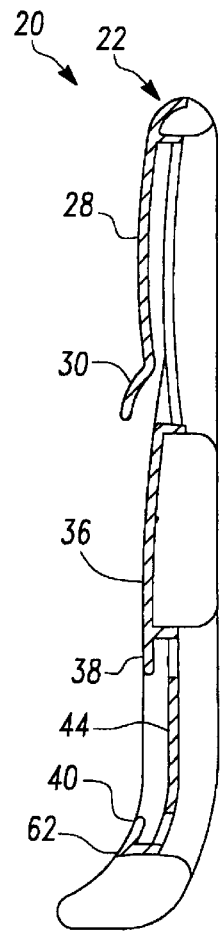
FIG. 8 is a sectional view along line 8—8 of FIG. 1.

As shown in FIG. 7, the foam lining 58 on the rear surface 56 of the outer shell 22 includes ventilation openings 60 in the foam lining 58 which are generally aligned with the vents 52 in the outer shell 22. As can be seen in FIG. 7, the locking tabs 32, in their normal undepressed position will substantially close the opening of the upper retention bracket 28, thereby preventing the shoulder strap from inadvertently sliding out from under the upper retention bracket 28. The locking tabs 32 must be depressed rearwardly in order to insert or remove the shoulder strap from the upper retention bracket 28. The chest protector 20 includes a lower end 62 which extends generally forwardly. As can be seen more clearly in FIG. 8, this positions the lower lap retention bracket 40 forwardly slightly. As a result, the lap belt path 44 is tilted, with the lower lap retention bracket 40 being forward of the upper lap retention portion 38. This properly positions the lap belt on the hips of the child.

Figure 9:
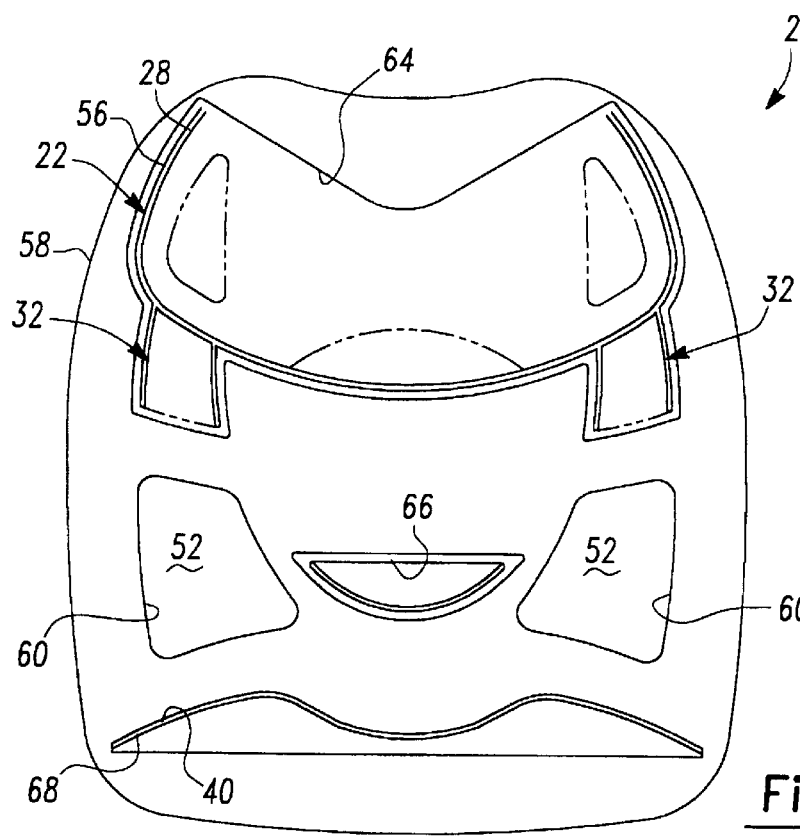
FIG. 9 is a rear view of the chest protector of FIG. 1.

FIG. 9 shows the rear view of the chest protector 20. The foam lining 58 is secured to the rear surface 56 of the outer shell 22. The foam lining 58 includes a plurality of openings or "shutoff zones" which are lined with certain portions on the outer shell 22. A first shutoff zone 64 generally corresponds to the upper retention bracket 28 and locking tabs 32 of the outer shell 22. The ventilation openings 60 are aligned with the vents 52 on the outer shell 22. A center shutoff zone 66 generally aligns with the upper lap retention portion 38 on the outer shell 22. A lower shutoff zone 68 is generally aligned with the lower lap retention bracket 40 on the outer shell 22. The shutoff zones 60, 64, 66, 68, together with the openings formed by the upper retention bracket 28, locking tabs 32, upper lap retention portion 38, vents 52 and lower lap retention bracket 40 provide ventilation to the child's chest and abdomen, thereby increasing comfort.

Figure 10:
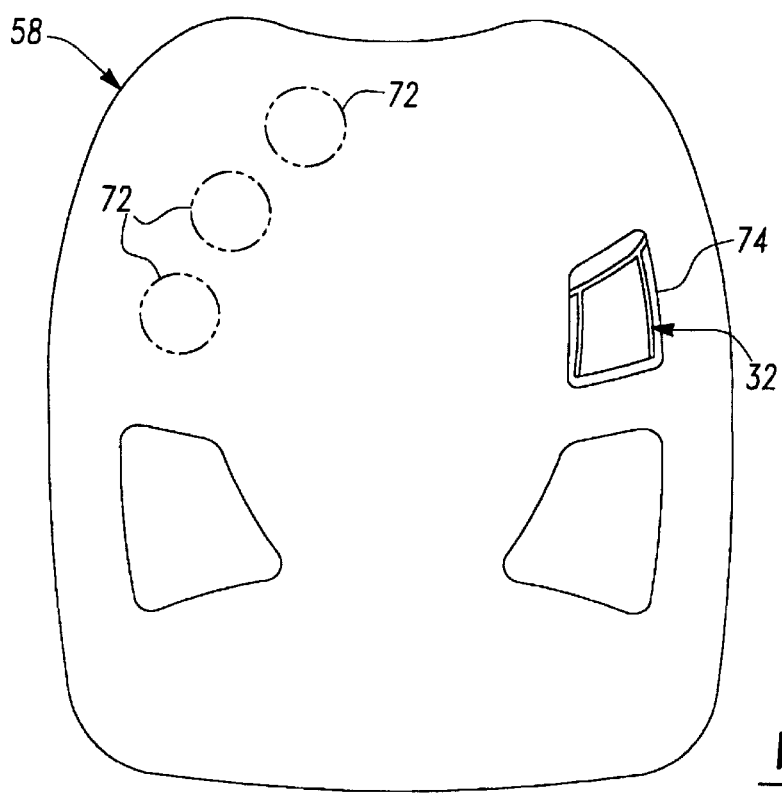
FIG. 10 is a rear view of an optional foam lining for the chest protector of FIG. 1.
Figure 11:
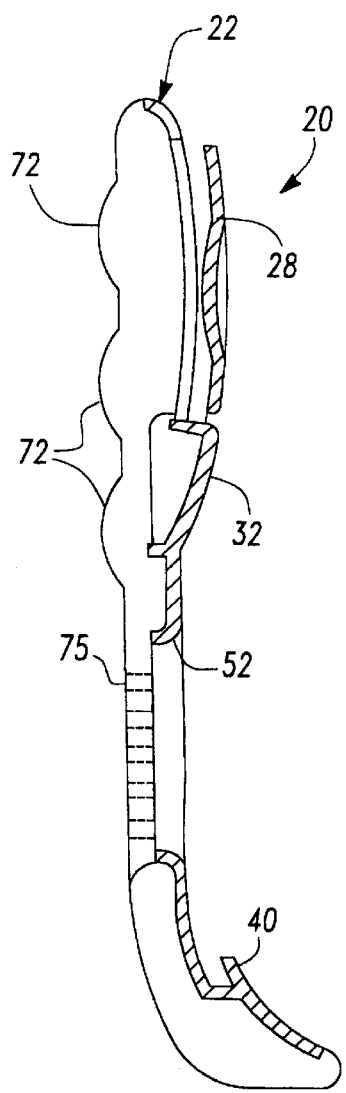
FIG. 11 is a sectional view of the chest protector of FIG. 10.

As can be seen in FIGS. 10 and 11, the foam lining 58 can include a sculpted pattern, such as a plurality of convex buttons 72 to provide increased ventilation and comfort. FIG. 10 also shows an optional relief 74 in the foam lining 58 to permit the depression of the locking tabs 32. The foam lining 58 could include small ventilation openings 75 aligned with vents 52, as an alternative to the larger ventilation openings 60, shown in FIG. 7.

Figure 12:
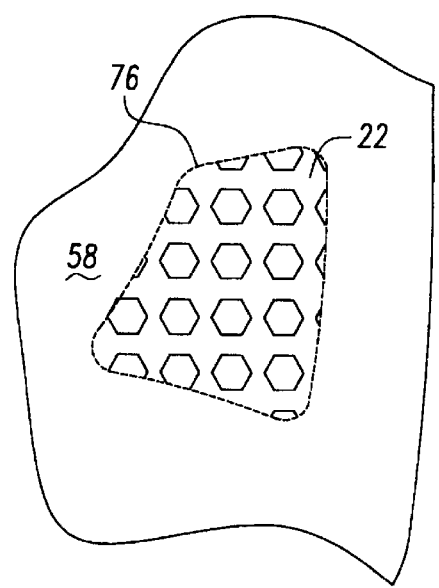
FIG. 12 is an enlarged view of an alternate vent for the chest protector of FIG. 1.

As can be seen in FIG. 12, the outer shell 22 could alternatively include the vents 76 having the optional vent patterns shown in place of the vents 52.

The chest protector 20 of the present invention is more comfortable than the previous chest protectors, will distribute force from an impact more evenly across the entire chest protector 20 and will shift a greater amount of force to the child's hips, rather than the abdomen. The curved outer shell 22 and foam lining 58 will increase the comfort and ventilation and distribute any force from the seatbelts more evenly across the entire chest protector 20. Further, the combination of a relatively rigid outer shell 22 with the softer foam lining 58 will also increase comfort and more evenly distribute the force in an impact. The slight tilt of the lap belt path 44 and the forward location of the lower lap retention bracket 40 relative to the upper lap retention portion 38 properly positions the lap belt on the child's hips, rather than the abdomen.

In operation, the shoulder belt is inserted into the upper retention bracket 28 by first depressing one of the locking tabs 32. Upon insertion of the shoulder strap under the upper retention bracket 28, the locking tab is released, thereby prevent the shoulder strap from unintentionally sliding out from under the upper retention bracket 28.

If the vehicle does not include an adjustable shoulder strap, the upper retention bracket 28 will also reposition the shoulder strap away from the wearer's neck to a proper position across the wearer's chest.

It should be apparent that the present invention should not be limited to use with children, but would also be beneficial to smaller adults.

In accordance with the provisions of the patent statutes, the present invention has been described in what is considered to represent a preferred embodiment. However, it should be noted that the invention can be practiced otherwise than as specifically illustrated and described without departing from its spirit or scope.

What is claimed is:

1. A chest protector for use with a vehicle restraint system generally comprising:
    a rigid plastic outer shell having a first retention bracket for retaining a shoulder strap;
    a second retention bracket for retaining a lap belt;
    at least two locking members adjacent an opening of said first retention bracket, on opposite sides of an axial center line of the outer shell, such that one of the locking members can be ulilized with a left hand shoulder strap and the other can be used with a right hand shoulder strap;
    each of said locking members being selectively movable from a first position substantially closing an opening of the first retention bracket and impeding insertion and removal of a shoulder strap to a second position opening said opening in said first retention bracket permitting the insertion and removal of a shoulder strap.

2. The chest protector of claim 1, where at least one locking member is formed integrally with said outer shell.

3. The chest protector of claim 1 wherein the outer shell is hard plastic.

4. The chest protector of claim 1, wherein said second retention bracket comprises an upper lap bracket and a lower lap bracket, said lower lap bracket positioned forwardly of said upper lap bracket.

5. The chest protector of claim 1, further including a foam lining on a rear surface of said outer shell.

6. The chest protector of claim 1, wherein said outer shell includes at least one vent opening.

7. The chest protector of claim 1, wherein said outer shell includes a concave rear surface.

8. The chest protector of claim 1 wherein the at least one locking member pivots generally along an axis generally parallel to the outer shell from said first position to the second position.

9. A chest protector for use with a vehicle restraint system generally comprising:
    an outer shell having a first retention bracket for retaining a shoulder strap;
    an upper lap bracket having an opening;
    a lower lap bracket opening generally toward said upper lap bracket thereby defining a lap belt path between said upper lap bracket and said lower lap bracket, said outer shell having a generally concave front surface such that said lower lap bracket is positioned forwardly of said upper lap bracket.

10. The chest protector of claim 9, further including:
    at least one locking member adjacent an opening of said first retention bracket, said at least one locking member being selectively moveable from a first position to a second position, said locking member in said first position substantially closing an opening of the first retention bracket to impede the removal of a shoulder strap, said locking member in said second position permitting removal of a shoulder strap.

11. The chest protector of claim 10, wherein said at least one locking member is formed integrally with said outer shell.

12. A chest protector for use with a vehicle restraint system generally comprising:
    a plastic outer shell having a first retention bracket for retailing a shoulder strap;
    an upper lap bracket having an opening;
    a lower lap bracket opening generally toward said upper lap bracket thereby defining a lap belt path between said upper lap bracket and said lower lap bracket, said lower lap bracket positioned forwardly of said upper lap bracket;
    a liner on a rear surface of the outer shell, said liner being less rigid than said outer shell.

13. The chest protector of claim 11 wherein the liner is a foam.

14. The chest protector of claim 12 wherein the outer shell is hard plastic.

* * * * *